April 16, 1935. A. BOUDREAU ET AL 1,997,714
PISTON RING
Filed Aug. 13, 1934
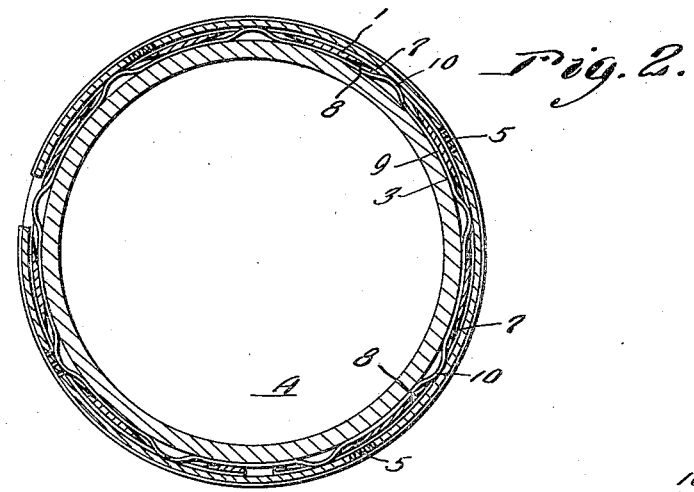
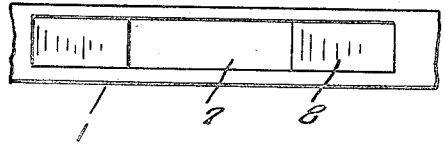
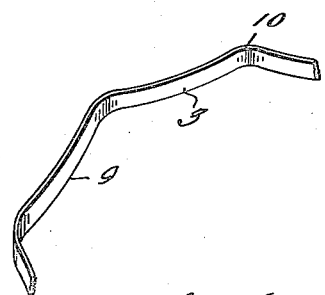
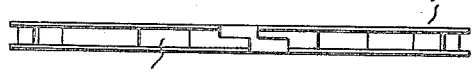
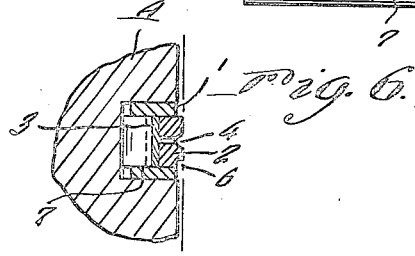
Inventors
Augustus Boudreau
Peyton L. Cobbins
By Clarence A. O'Brien
Attorney Patented Apr. 16, 1935

1,997,714

UNITED STATES PATENT OFFICE 1,997,714

PISTON RING

Augustus Boudreau and Peyton L. Cobbins, Newton Lower Falls, Mass.

Application August 13, 1934, Serial No. 739,661

3 Claims. (Cl. 309—45)

This invention relates to a piston ring, the general object of the invention being to provide a ring of considerable flexibility and which is evenly and firmly held against the cylinder wall by an expander which has a plurality of bearing points against this ring, whereby leakage of oil and compression is practically eliminated by the use of this ring.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Fig. 1 is an edge view of the ring.

Fig. 2 is a sectional view through a piston and showing the improved ring in place with parts of the ring in section.

Fig. 3 is a fragmentary view looking toward the inner edge of the channel ring.

Fig. 4 is a fragmentary perspective view of the expander.

Fig. 5 is an edge view of the channel ring.

Fig. 6 is a fragmentary vertical sectional view through a piston and the improved ring.

As shown in this drawing, the ring is composed of the channel ring 1, a grooved ring 2 which has a sliding fit in the channel ring, and the expander ring 3. These rings are of split construction and the rings 1 and 2 are preferably provided with stepped ends as shown in Fig. 1. The ring 2 is formed with a circumferentially extending groove 4 and the spaced groups of holes 5 which extend from the groove 4 to the inner edge of the ring and the lower outer corner of the ring is recessed as shown at 6. The channel ring is formed with a plurality of openings 7 which extend from the bottom of the channel through the inner face or edge of the ring and said inner edge has the sloping portions 8 which extend from the ends of each opening outwardly, in opposite directions to the inner face or edge of the ring as shown in Figs. 2 and 3. The expander ring 3 is formed of a plurality of inwardly bowed parts 9 which form what might be termed the bearing points 10, one of which is formed at the junction of the two ends of the ring as shown in Fig. 2.

It will be understood that the channel ring 1 forms a guide for the rings 2 and 3 as the ring 2 is slidably supported by the ring 1 and the points 10 of the ring 3 extending through the openings 7 of the ring 4, causes the ring 3 to be guided by the ring 1 during the expanding and contracting movements of the ring 3. It will also be seen that the ring 3 has a plurality of pressure points pressing the ring 2 against the cylinder wall as shown in Fig. 6, so that the ring 2 is evenly and firmly pressed against the cylinder wall. The undercut 6 acts to prevent the passage of oil upwardly past the rings and oil entering the groove 4 will pass through the holes 5 into the rings and the groove of the piston A and thus find its way back to the crank case while thoroughly lubricating the parts and this construction of ring will prevent loss of compression past the piston into the crank case.

It is thought from the foregoing description that the advantages and novel features of the invention will be readily apparent.

It is to be understood that changes may be made in the construction and in the combination and arrangement of the several parts, provided that such changes fall within the scope of the appended claims.

We claim:

1. A piston ring of the class described comprising a channel ring, a grooved ring slidably arranged in the channel ring and having holes therein connecting the grooves with the inner edge of the grooved ring, said channel ring having openings in its bottom wall and an expander ring having pressure points passed through the openings and engaging the grooved ring.

2. A piston ring of the class described comprising a channel ring having openings in its inner edge connecting the channel with the piston groove, the inner wall of the ring having sloping points leading from the ends of the openings outwardly in opposite directions to the inner wall of the ring, a grooved ring slidably arranged in the channel ring, and an expander ring having a plurality of pressure points passing through the openings and engaging the grooved ring.

3. A piston ring of the class described comprising a channel ring having openings in its inner edge connecting the channel with the piston grooves, the inner wall of the ring having sloping points leading from the ends of the openings outwardly in opposite directions to the inner wall of the ring, a grooved ring slidably arranged in the channel ring, and an expander ring having a plurality of pressure points passing through the openings and engaging the grooved ring, said grooved ring having groups of openings passing from the groove to the inner edge of the ring with one of its outer corners recessed and all three rings being of split construction.

AUGUSTUS BOUDREAU.
PEYTON L. COBBINS.